US012793547B2

(12) United States Patent
Kopytjuk et al.

(10) Patent No.: US 12,793,547 B2
(45) Date of Patent: Nov. 10, 2026

(54) SYSTEM AND METHOD OF PROVIDING CONSTRUCTION AREAS DETAILS TO AN AUTONOMOUS VEHICLE

(71) Applicant: Torc Robotics, Inc., Blacksburg, VA (US)

(72) Inventors: Marat Kopytjuk, Blacksburg, VA (US); Maximilian Koeper, Blacksburg, VA (US); Maximilian Yassine Beyen, Blacksburg, VA (US); Simon Bäuerle, Blacksburg, VA (US); Margarita Kunjavskaja, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 140 days.

(21) Appl. No.: 18/596,444

(22) Filed: Mar. 5, 2024

(65) Prior Publication Data

US 2025/0285538 A1 Sep. 11, 2025

(51) Int. Cl.

| | |
|---|---|
| ***G08G 1/0967*** | (2006.01) |
| ***B60W 30/182*** | (2020.01) |
| ***B60W 60/00*** | (2020.01) |
| ***E01C 23/16*** | (2006.01) |
| ***E01C 23/22*** | (2006.01) |

(52) U.S. Cl.

CPC ..... *G08G 1/096725* (2013.01); *B60W 30/182* (2013.01); *B60W 60/00184* (2020.02); *E01C 23/163* (2013.01); *E01C 23/222* (2013.01); *B60W 2420/403* (2013.01); *B60W 2552/53* (2020.02); *B60W 2556/45* (2020.02)

(58) Field of Classification Search

CPC .. G01C 21/3453; B60W 30/182; G08G 1/164
See application file for complete search history.

(56) References Cited

U.S. PATENT DOCUMENTS

| | | | | |
|---|---|---|---|---|
| 2015/0266471 | A1* | 9/2015 | Ferguson | G05D 1/024 701/1 |
| 2018/0203455 | A1* | 7/2018 | Cronin | G01C 21/3492 |
| 2019/0196466 | A1* | 6/2019 | Agarwal | G05D 1/0061 |
| 2020/0191602 | A1* | 6/2020 | Zhang | G08G 1/09623 |
| 2020/0407929 | A1 | 12/2020 | Falchetti | |

(Continued)

OTHER PUBLICATIONS https://fountainline.com.au/line-markers/smartline-gps-line-marker/ Accessed Jan. 9, 2024.

*Primary Examiner* — Fadey S. Jabr
*Assistant Examiner* — Mario C Gonzalez
(74) *Attorney, Agent, or Firm* — Armstrong Teasdale LLP

(57) ABSTRACT

A system including at least one processor and at least one memory storing instructions is disclosed. The instructions, when executed by the at least processor, configure the at least one processor to: (i) receive geolocation data corresponding to a first geolocation and a second geolocation, wherein the first geolocation is associated with a starting location of a construction work area and the second geolocation is associated with an ending location of the construction work area; (ii) identify an autonomous vehicle in proximity of the construction work area; (iii) transmit the geolocation data corresponding to the construction work area to the autonomous vehicle; and (iv) initiate a change, at the autonomous vehicle, in an operating mode of the autonomous vehicle to a reduced functionality mode.

16 Claims, 5 Drawing Sheets

(56) References Cited

U.S. PATENT DOCUMENTS

| | | | | |
|---|---|---|---|---|
| 2021/0103280 | A1 | 4/2021 | Lacaze | |
| 2022/0219732 | A1* | 7/2022 | Yoshizawa | G01C 21/3461 |
| 2023/0221447 | A1* | 7/2023 | Macvittie | E01C 23/07<br>701/50 |
| 2023/0282110 | A1* | 9/2023 | Schwear | G08G 1/096775<br>340/905 |

* cited by examiner

SYSTEM AND METHOD OF PROVIDING CONSTRUCTION AREAS DETAILS TO AN AUTONOMOUS VEHICLE

TECHNICAL FIELD

The field of the disclosure relates generally to autonomous vehicles and, more specifically, to systems and methods of providing construction area details to an autonomous vehicle.

BACKGROUND

At least some known autonomous vehicles may implement four fundamental technologies in their autonomy software system: perception, localization, behaviors and planning, and motion control. Perception technologies enable an autonomous vehicle to sense and process its environment. Perception technologies process a sensed environment to identify and classify objects, or groups of objects, in the environment, for example, pedestrians, vehicles, or debris. Behaviors and planning technologies determine how to move through the sensed environment to reach a planned destination, processing data representing the sensed environment and localization or mapping data to plan maneuvers and routes to reach the planned destination. Motion control technologies translate the output of behaviors and planning technologies into concrete commands to the vehicle via the vehicle interface provided by the internal electronic control unit (ECU).

Generally, localization or mapping data are correct such that the localization technologies can determine, based on the sensed environment, for example, where in the world, or on a map, the autonomous vehicle is. Localization technologies may process features in the sensed environment to correlate, or register, those features to known features on a map. Additionally, localization technologies may use data received from sensors or various odometry information sources to generate an estimated vehicle location in the world. However, when the autonomous vehicle is passing through a construction zone where the known normal traffic lane markings have been updated or no longer exist, or the traffic lane geometries may have been modified, map data relied upon by the autonomous vehicle may be incorrect and therefore poses significant risk to the safety of the autonomous vehicle and its passengers. Additionally, detecting construction areas using sensor data is challenging or too late in many cases such that it is an operational design domain (ODD) violation for ensuring safety of the autonomous vehicle.

Accordingly, there exists a need for systems and methods for identifying construction areas to ensure safety of the autonomous vehicle.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY

In one aspect, a system including at least one processor, and at least one memory storing instructions is disclosed. The instructions, when executed by the at least one processor, configure the at least one processor to: (i) receive geolocation data corresponding to a first geolocation and a second geolocation, wherein the first geolocation is associated with a starting location of a construction work area and the second geolocation is associated with an ending location of the construction work area; (ii) identify an autonomous vehicle in proximity of the construction work area; (iii) transmit the geolocation data corresponding to the construction work area to the autonomous vehicle; and (iv) initiate a change, at the autonomous vehicle, in an operating mode of the autonomous vehicle to a reduced functionality mode.

In another aspect, an autonomous vehicle including at least one processor, and at least one memory storing instructions is disclosed. The instructions, when executed by the at least one processor, configure the at least one processor to: (i) transmit, to an application server, current geolocation data of the autonomous vehicle; (ii) receive, from the application server, geolocation data corresponding to a first geolocation and a second geolocation, wherein the first geolocation is associated with a starting location of a construction work area and the second geolocation is associated with an ending location of the construction work area; and (iii) based upon the received geolocation data associated with the construction work area, initiate a change in an operating mode of the autonomous vehicle to a reduced functionality mode as the autonomous vehicle approaches the starting location of the construction work area or while the autonomous vehicle is driving through the construction work area.

In yet another aspect, an equipment including at least one processor, and at least one memory storing instructions is disclosed. The instructions, when executed by the at least one processor, configure the at least one processor to: in response to receiving a first user input, transmit, to a computing system, geolocation data corresponding to a first geolocation of the equipment based on data received from the GPS sensor when the first user input is received; and (ii) in response to receiving a second user input after receiving the first user input, transmit, to the computing system, geolocation data corresponding to a second geolocation of the equipment based on data received from the GPS sensor when the second user input is received. The first geolocation is associated with a starting location of a construction work area and the second geolocation is associated with an ending location of the construction work area.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
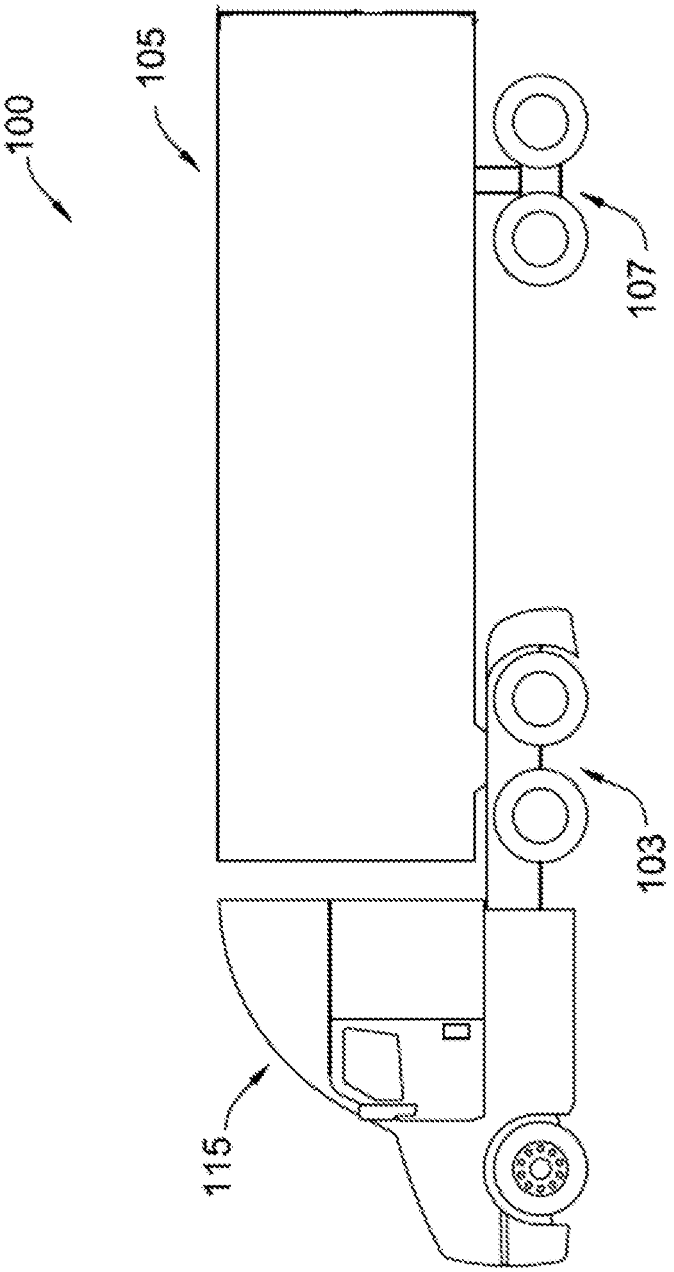
FIG. 1 is a side view of an example autonomous vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure. The following terms are used in the present disclosure as defined below.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane or parking the vehicle without human intervention. A semi-autonomous vehicle has an autonomy level of level-1, level-2, or level-3 recognized by NHTSA. The semi-autonomous vehicle requires a human driver at all times for operating the semi-autonomous vehicle.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

Mission control: Mission control, also referenced herein as a centralized or regionalized control, is a hub in communication with one or more autonomous vehicles of a fleet. Database or datastore at mission control may store data received from the autonomous vehicles. Mission control may receive data corresponding to construction areas in which traffic lanes have been modified, updated, removed, or changed. Mission control may use the received data related to known construction area to notify one or more autonomous vehicle of the fleet or modify a route of the autonomous vehicle based on the data related to known construction areas. Mission control may also change a mechanism or input weights of data from various sensors used by the autonomous vehicle in localization technologies.

As described herein, automated driving (AD) functions rely on localization technologies using up-to-date high definition (HD) map data. The HD map data includes traffic lane markings and traffic lane geometries (e.g., a width of a traffic lane) etc. However, the traffic lane markings or traffic lane geometries may vary over time for various reasons including, but not limited to, temporary constructions, road widening or narrowing projects, lane closures, etc., making data of HD map to become outdated. Such outdated data or information of the HD map may lead to an ODD violation and major issues for essential AD functions.

While construction areas, in which traffic lane markings or traffic lane geometries have changed, may be detected using one or more image sensors (e.g., camera sensors) installed on a vehicle (e.g., an autonomous vehicle, a semi-autonomous vehicle, or a non-autonomous vehicle). However, often times detecting such changes to traffic lane markings or traffic lane geometries are challenging, for example, at night times, or under adverse weather conditions such as rain, fog, or snow. Additionally, or alternatively, data collected using the one or more image sensors is not shared among different vehicle manufacturers. In many cases, therefore, when the construction areas have changed traffic lane markings or traffic lane geometries are perceived by the vehicle dynamics function, it is often a too late detection and the ODD violation for safety of the autonomous vehicle.

Accordingly, various embodiments described in the present disclosure provide systems and methods to provide details of a construction area to mission control to notify autonomous vehicles of the construction areas on their route of driving in advance. Based on the received notification of the construction area, the autonomous vehicle may either change their route to avoid the construction areas or may employ different mechanisms to detect changes to the traffic lane markings or traffic lane geometries. Alternatively, or additionally, the autonomous vehicle may move to a reduced functionality mode (e.g., disabling the AD function while in the vehicle is in the construction area) to ensure safety of the autonomous vehicle.

In some embodiments, a lane marking equipment may be equipped with a global positioning system (GPS) device and a computing device that is configured to receive a first GPS location data corresponding to a starting geolocation of a construction zone in which traffic lane markings are being updated, e.g., being repainted, shifted, removed, or being washed, or traffic lane geometries are being changed, e.g., traffic lane widths are being narrowed. In particular, an operator of the lane marking equipment may select an electromechanical switch or trigger a lever to identify the starting geolocation of the construction zone or an option on a graphical user interface (GUI) of a frontend application executing on the computing device to identify the starting geolocation of the construction zone. The electromechanical switch or lever is positioned as a fixed element in the lane marking equipment. The computing device may also be positioned as a fixed element in the lane marking equipment. In some embodiments, the electromechanical switch or lever when activated to identify and notify the starting geolocation of the construction zone may also begin an operation, such as, but not limited to, painting a lane, etc. Similarly, when the option to identify, and therefore report, the starting geolocation of the construction zone is selected on the GUI of the frontend application, the operation, such as, but not limited to, painting a lane, etc., may be initiated.

GPS data of the lane marking equipment is communicated via a network interface of the lane marking equipment to mission control as long as the operator engages the electromechanical switch or trigger, or until the operator of the lane marking equipment changes a mode of the electromechanical switch or lever or selects an option on the GUI of the frontend application, to identify an ending geolocation of the construction zone. In some embodiments, when the mode of the electromechanical switch or lever is changed to identify and notify the ending geolocation of the construction zone, the operation, such as, but not limited to, painting a lane, etc., may be terminated or ended. Similarly, when the option to identify, and therefore report, the ending geolocation of the construction zone is selected on the GUI of the frontend application, the operation, such as, but not limited to, painting a lane, etc., may be terminated or ended. By way of a non-limiting example, the network interface may provide a unidirectional or a bidirectional connection with mission control using a satellite network or a cellular network. The GPS data of the lane marking equipment may be transmitted to mission control periodically (e.g., every 30 seconds or 60 seconds, or at any other predetermined time duration). Based upon the received GPS data, mission control may identify an area in which the traffic lane markings or traffic lane geometries may have changed causing the HD map data to become temporarily or permanently incorrect.

Based upon the identified area in which the traffic lane markings or traffic lane geometries may have changed, and current geolocation of an autonomous vehicle, mission control may provide details of the identified area to the autonomous vehicle such that the autonomous vehicle may change its mode to a reduced functionality mode, disable AD function, or provide more weight to sensor data (e.g., data from a camera) over HD map data for localization function, etc., as the autonomous vehicle approach the identified area mentioned by mission control. Additionally, or alternatively, the autonomous vehicle may update its route, or mission control may change route details of the autonomous vehicle, to avoid the autonomous vehicle to drive through the identified area.

The embodiments described herein thus increases safety of the autonomous vehicle while the autonomous vehicle is passing through an area in which traffic lane markings or traffic lane geometries may have been changed. Additionally, because the details of the area in which traffic lane markings or traffic lane geometries may have been changed is known by mission control and communicated to the autonomous vehicle, problems associated with late detection of changes to traffic lane markings or traffic lane geometries may be avoided.

As described herein, the embodiments are described with regards to the autonomous vehicle may also be applicable to a non-autonomous vehicle or a semi-autonomous vehicle. Additionally, any other vehicle or equipment configured with a GPS device to transmit its geolocation data to identify a starting location and an ending location of a construction area may be used instead of a lane marking equipment equipped with a GPS device to transmit its geolocation data to mission control. Various features or embodiments described above are discussed in more detail below with respect to FIGS. 1-5.

FIG. 1 is a side view of a vehicle 100. The vehicle 100 is configured for an automated driving (AD) function via an autonomy system 102 (shown in FIG. 2). The vehicle 100 includes a trailer 105, a tractor 115 connectable to the trailer 105, a front wheel set 103 to support the tractor 115, and a back wheel set 107 to support the trailer 105. The autonomy system 102 may be used to control the vehicle 100, such as to control movement of the vehicle 100, plan movement of the vehicle 100, or change a route of the vehicle 100. The vehicle 100 may have a plurality of sensors including, but not limited to only, one or more cameras, one or more infrared sensors, one or more location sensors, one or more radio detection and ranging (RADAR) sensors, one or more light detection and ranging (LiDAR) sensors, etc.

Figure 2:
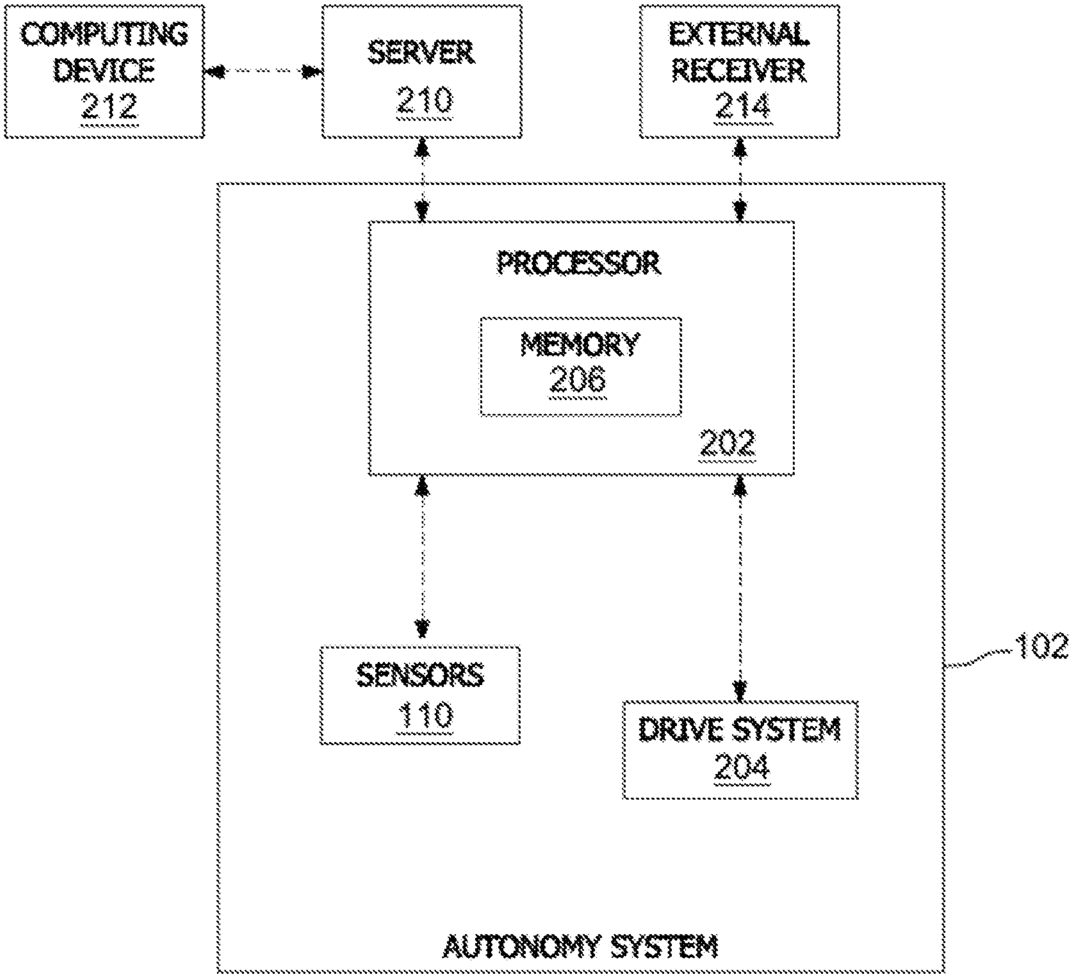
FIG. 2 is a schematic of an autonomy system for use with the autonomous vehicle shown in FIG. 1.

FIG. 2 is a schematic of the autonomy system 102 for use with the vehicle 100. The autonomy system 102 may be used with any embodiment of the autonomous vehicle 100 as described herein. The autonomy system 102 includes a processor 202 receiving data from sensors 110. The processor 202 may also be in communication with a drive system 204 to autonomously control movement of the vehicle 100. The processor 202 may be one or more processing systems. The processor 202 includes a memory 206. The memory 206 may be any device allowing information such as executable instructions or data to be stored and retrieved. The processor 202 may include one or more processing units to retrieve and execute instructions or data stored by the memory 206. Alternatively, the processor 202 may be coupled with the memory 206, which is not included in the processor 202 or may be independent of the processor 202.

In some embodiments, the processor 202 may transmit, to an application server (or mission control), current geolocation data of the autonomous vehicle. The processor 202 may periodically transmit current geolocation data of the autonomous vehicle. The processor 202 may receive, from the application server (or mission control), geolocation data corresponding to a first geolocation and a second geolocation. In the exemplary embodiment, the first geolocation is associated with a starting location of a construction work area and the second geolocation is associated with an ending location of the construction work area. Based upon the received geolocation data associated with the construction work area, the processor 202 may change an operating mode of the autonomous vehicle to a reduced functionality mode as the autonomous vehicle approaches the starting location of the construction work area or while the autonomous vehicle is driving through the construction work area. The reduced functionality mode may include an automated driving (AD) function being disabled.

In some embodiments, the processor 202 may receive, from the application server (or mission control), an updated route to avoid driving through the construction work area. The processor 202 may use sensor data of one or more image sensors for detecting a traffic lane marking and/or a width of a traffic lane. The processor 202 may provide a higher weightage to sensor data of one or more image sensors installed within the autonomous vehicle over map data stored in the at least one memory while performing a localization function, while the autonomous vehicle is driving through the construction work area or as the autonomous vehicle approaches the starting location of the construction work area. In some embodiments, and by way of a non-limiting example, the processor 202 may disregard the map data while performing the localization function.

The autonomy system 102 may control the drive system 204 based at least in part upon signals received from a server 210 to control the drive system 204 or transmit signals including geolocation data of the vehicle 100 to the server 210. The server 210 may be in communication with a computing device 212, such as, but not limited to, a user computing device of a mission control agent, or an artificial intelligence agent. The autonomy system 102 may control operations of the vehicle 100 including transitioning the vehicle 100 to a reduced functionality mode or changing a route of the vehicle 100.

Figure 3:
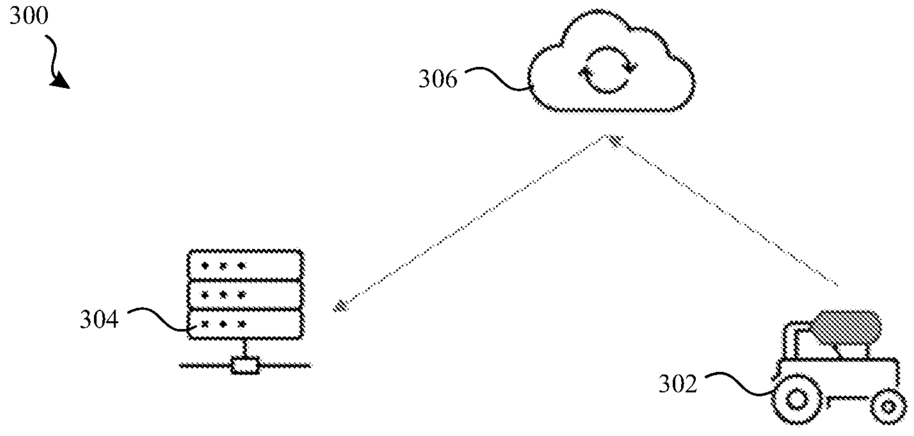
FIG. 3 is an exemplary network diagram for receiving construction area details at mission control.

FIG. 3 is an exemplary network diagram 300 for receiving construction area details at mission control. As shown in the diagram 300, a lane marking equipment 302 may be equipped with a global positioning system (GPS) device (not shown in FIG. 3) and a computing device (not shown in FIG. 3) that is configured to receive a first GPS location data corresponding to a starting geolocation of a construction zone in which traffic lane markings are being updated, e.g., being repainted, shifted, removed, or being washed, or traffic lane geometries are being changed, e.g., traffic lane widths are being narrowed. In particular, an operator of the lane marking equipment 302 may select an electromechanical switch (not shown in FIG. 3) or trigger a lever (not shown in FIG. 3) to identify the starting geolocation of the construction zone or an option on a graphical user interface (GUI) of a frontend application executing on the computing device to identify the starting geolocation of the construction zone.

In other words, in response to receiving a first user input, the computing device of the lane marking equipment 302 may transmit, to mission control 304, geolocation data corresponding to a first geolocation of the lane marking equipment 302 based on data received from the GPS sensor device when the first user input is received, and in response to receiving a second user input after receiving the first user input, the lane marking equipment 302 may transmit, to mission control 304, geolocation data corresponding to a second geolocation of the lane marking equipment 302 based on data received from the GPS sensor device when the second user input is received. The first user input or the second user input may be received from a multi-position switch or a multi-position lever. Additionally, or alternatively, the first user input or the second user input may be received at a graphical user interface of a frontend application executing on the computing device of the lane marking equipment 302.

Until the operator of the lane marking equipment changes a mode of the electromechanical switch or lever, or selects an option on the GUI of the frontend application, to identify an ending geolocation of the construction zone, GPS data of the lane marking equipment 302 may be communicated via a network interface (not shown in FIG. 3) of the lane marking equipment to mission control 304. By way of a non-limiting example, the network interface may provide a unidirectional or a bidirectional connection with mission control 304 using a network 306. By way of a non-limiting example, the network 306 may be a satellite network or a cellular network. The GPS data of the lane marking equipment 302 may be transmitted to mission control 304 periodically (e.g., every 30 seconds or 60 seconds, or at any other predetermined time duration). Based upon the received GPS data, mission control 304 may identify an area in which the traffic lane markings or traffic lane geometries may have changed causing the HD map data to become temporarily or permanently incorrect.

Based upon the identified area in which the traffic lane markings or traffic lane geometries may have changed, and current geolocation of an autonomous vehicle 100 (shown in FIG. 1), mission control 304 may provide details of the identified area to the autonomous vehicle 100 such that the autonomous vehicle 100 may change its mode to a reduced functionality mode, disable AD function, or provide more weight to sensor data (e.g., data from a camera) over HD map data for a localization function, etc., as the autonomous vehicle 100 approach the identified area mentioned by mission control 304. Additionally, or alternatively, the autonomous vehicle 100 may update its route, or mission control may change route details of the autonomous vehicle 100, to avoid the autonomous vehicle 100 to drive through the identified area.

Figure 4:
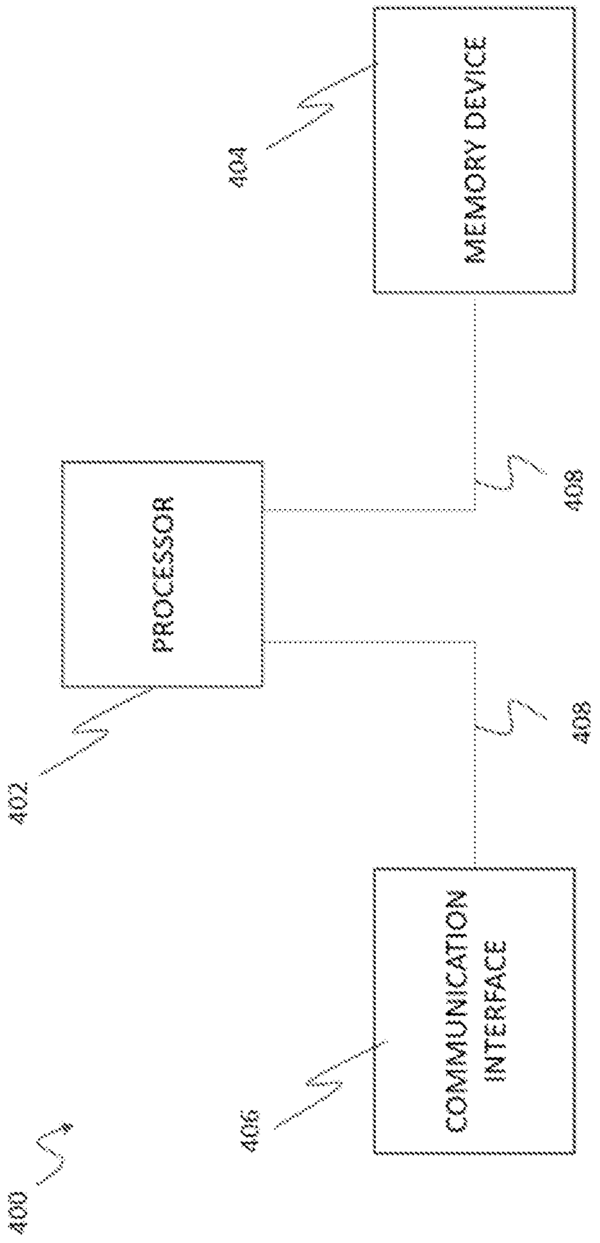
FIG. 4 is a block diagram of an example computing device of a lane marking equipment.

FIG. 4 is a block diagram of an example computing device 400. Computing device 400 includes a processor 402 and a memory device 404. The processor 402 is coupled to the memory device 404 via a system bus 408. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 404 includes one or more devices that enable information, such as executable instructions or other data (e.g., sensor data), to be stored and retrieved. Moreover, the memory device 404 includes one or more computer readable media, such as, without limitation, dynamic random access memory (DRAM), static random access memory (SRAM), a solid state disk, or a hard disk. In the example embodiment, the memory device 404 stores, without limitation, application source code, application object code, configuration data, additional input events, application states, assertion statements, validation results, or any other type of data. The computing device 400, in the example embodiment, may also include a communication interface 406 that is coupled to the processor 402 via system bus 408. Moreover, the communication interface 406 is communicatively coupled to data acquisition devices.

In the example embodiment, processor 402 may be programmed by encoding an operation using one or more executable instructions and providing the executable instructions in the memory device 404. In the example embodiment, the processor 402 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

Figure 5:
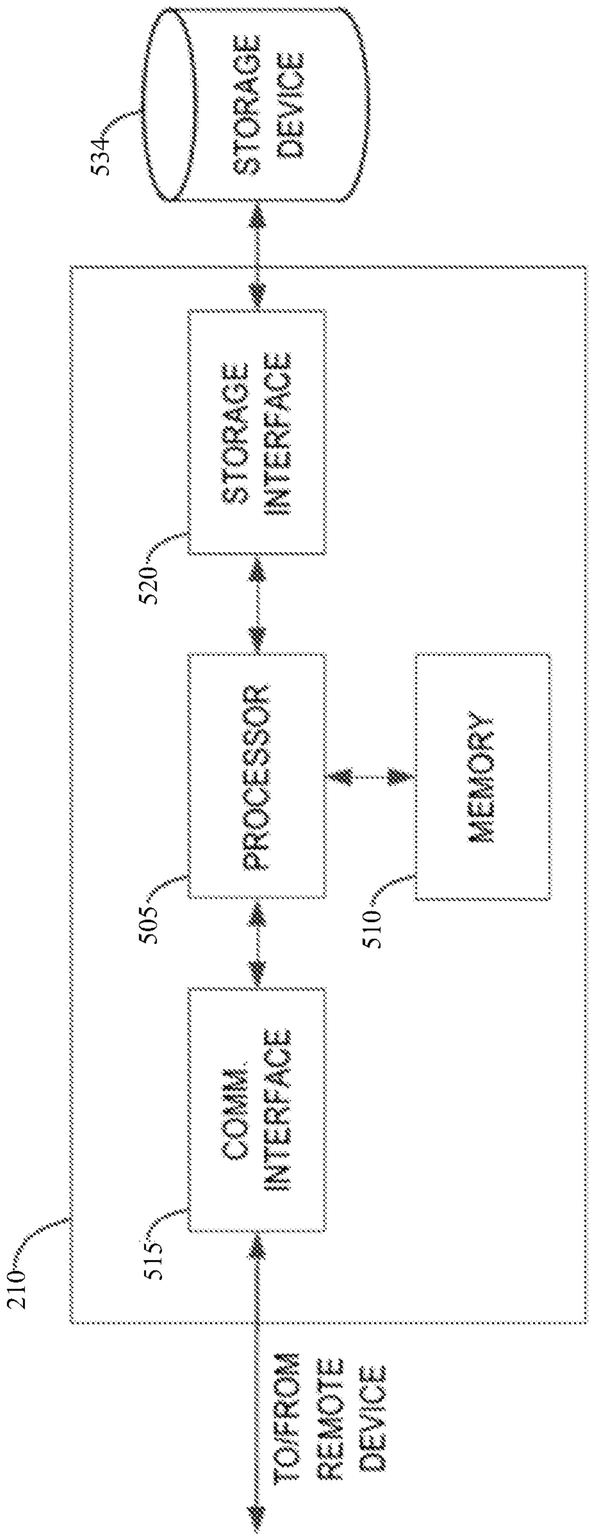
FIG. 5 illustrates an example configuration of a server shown in FIG. 2 positioned at mission control.

FIG. 5 illustrates an example configuration 500 of a server 210 shown in FIG. 2. Server 210 includes a processor 505 for executing instructions. Instructions may be stored in a memory area 510, for example. Processor 505 may include one or more processing units (e.g., in a multi-core configuration) for executing instructions. The instructions may be executed within a variety of different operating systems on the server 210, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 505 is operatively coupled to a communication interface 515 such that the server 210 is capable of communicating with remote devices such as an autonomous vehicle 100, a computing device 400 shown in FIG. 4, or another server 210. For example, communication interface 515 may receive GPS data from the computing device 400 positioned within the lane marking equipment 302 (shown in FIG. 3) via the network 306 shown in FIG. 3.

In some embodiments, the processor 505 of the server 210 may receive geolocation data corresponding to a first geolocation and a second geolocation from the computing device 400 positioned within the lane marking equipment 302 (or any vehicle or equipment), wherein the first geolocation is associated with a starting location of a construction work area and the second geolocation is associated with an ending location of the construction work area. The processor 505 of the server 210 also identifies one or more autonomous vehicles that are in proximity of the construction work area based upon geolocation data received from the one or more autonomous vehicles. The processor 505 transmits the geolocation data corresponding to the construction work area to the one or more autonomous vehicles and cause the one or more autonomous vehicles to change an operating mode of the autonomous vehicle to a reduced functionality mode. In some embodiments, and by way of a non-limiting example, the reduced functionality mode includes an AD function being disabled for the autonomous vehicle.

In some embodiments, the processor 505 may transmit an updated route to the autonomous vehicle to avoid the autonomous vehicle driving through the construction work area. The processor 505 may cause the autonomous vehicle to use sensor data for detecting a traffic lane marking and/or a width of a traffic lane. The sensor data may include data from one or more image sensors. The processor 505 may cause the autonomous vehicle to provide a higher weightage to sensor data of one or more sensors installed within the autonomous vehicle over stored map data while performing a localization function. By way of a non-limiting example, the processor 505 may cause the autonomous vehicle to disregard stored map data while performing the localization function. In other words, the weightage given to stored map data while performing the localization function is 0%.

Processor 505 may also be operatively coupled to a storage device 534, which may be used to store geolocation data from the lane marking equipment 302 identifying a construction area. Storage device 534 is any computer-operated hardware suitable for storing and/or retrieving data. In some embodiments, storage device 534 is integrated in server 210. For example, server 210 may include one or more hard disk drives as storage device 534. In other embodiments, storage device 534 is external to server 210 and may be accessed by a plurality of servers 210. For example, storage device 534 may include multiple storage units such as hard disks or solid state disks in a redundant array of inexpensive disks (RAID) configuration. Storage device 534 may include a storage area network (SAN) and/or a network attached storage (NAS) system.

In some embodiments, processor 505 is operatively coupled to storage device 534 via a storage interface 520. Storage interface 520 is any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Memory area 510 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only and are thus not limiting as to the types of memory usable for storage of a computer program. In operation, the server 210 may communicate with remote devices such as an autonomous vehicle 100 for providing details of a construction area based on geolocation data received from a computing device 400 positioned within a lane marking equipment 302 (shown in FIG. 3) via the network 306.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system comprising:

a lane marking equipment configured to update one or more lane markings in the construction work area;

at least one processor of a server computing device, the server computing device in communication with one or more autonomous vehicles in a fleet; and at least one memory of the server computing device, the at least one memory storing instructions, which, when executed by the at least one processor, configure the at least one processor to:

receive geolocation data corresponding to a first geolocation and a second geolocation, wherein the first geolocation is associated with a starting location of a construction work area and the second geolocation is associated with an ending location of the construction work area, the first geolocation and the second geolocation sent from a lane marking equipment when the lane marking equipment starts and ends in updating the one or more lane markings;

identify an autonomous vehicle in the fleet in proximity of the construction work area;

transmit the geolocation data corresponding to the construction work area to the autonomous vehicle; and initiate a change, at the autonomous vehicle, in an operating mode of the autonomous vehicle to a reduced functionality mode.

2. The system of claim 1, wherein the instructions further configure the at least one processor to transmit an updated route to the autonomous vehicle to avoid the autonomous vehicle driving through the construction work area.

3. The system of claim 1, wherein the instructions further configure the at least one processor to instruct the autonomous vehicle to use sensor data for detecting a traffic lane marking.

4. The system of claim 3, wherein the instructions further configure the at least one processor to instruct the autonomous vehicle to use the sensor data for detecting a width of a traffic lane.

5. The system of claim 3, wherein the sensor data includes data from one or more image sensors.

6. The system of claim 1, wherein the instructions further configure the at least one processor to instruct the autonomous vehicle to apply a higher weight to sensor data of one or more sensors installed within the autonomous vehicle over stored map data while performing a localization function.

7. The system of claim 6, wherein the instructions further configure the at least one processor to instruct the autonomous vehicle to disregard stored map data while performing the localization function.

8. The system of claim 1, wherein the reduced functionality mode includes an automated driving (AD) function being disabled.

9. An autonomous vehicle comprising:

at least one processor; and at least one memory storing instructions, which, when executed by the at least one processor, configure the at least one processor to:

transmit, to an application server, current geolocation data of the autonomous vehicle;

receive, from the application server, geolocation data corresponding to a first geolocation and a second geolocation, wherein the first geolocation is associated with a starting location of a construction work area and the second geolocation is associated with an ending location of the construction work area, the first geolocation and the second geolocation sent from a lane marking equipment when the lane marking equipment starts and ends in updating the one or more lane markings; and based upon the received geolocation data associated with the construction work area, initiate a change in an operating mode of the autonomous vehicle to a reduced functionality mode as the autonomous vehicle approaches the starting location of the construction work area or while the autonomous vehicle is driving through the construction work area.

10. The autonomous vehicle of claim 9, wherein the instructions further configure the at least one processor to receive, from the application server, an updated route to the autonomous vehicle to avoid driving through the construction work area.

11. The autonomous vehicle of claim 9, wherein the instructions further configure the at least one processor to use sensor data of one or more sensors for detecting a traffic lane marking.

12. The autonomous vehicle of claim 11, wherein the instructions further configure the at least one processor to use the sensor data for detecting a width of a traffic lane.

13. The autonomous vehicle of claim 11, wherein the sensor data includes data from one or more image sensors.

14. The autonomous vehicle of claim 9, wherein the instructions further configure the at least one processor to apply a higher weight to sensor data of one or more image sensors installed within the autonomous vehicle over map data stored in the at least one memory while performing a localization function.

15. The autonomous vehicle of claim 14, wherein the instructions further configure the at least one processor to disregard the map data while performing the localization function.

16. The autonomous vehicle of claim 9, wherein the reduced functionality mode includes an automated driving (AD) function being disabled.

* * * * *